(12) United States Patent
Gnuschke et al.

(10) Patent No.: US 9,936,235 B2
(45) Date of Patent: *Apr. 3, 2018

(54) PERSONAL BASE STATION SYSTEM WITH WIRELESS VIDEO CAPABILITY

(71) Applicant: AT&T Mobility II LLC, Atlanta, GA (US)

(72) Inventors: Jerald J. Gnuschke, Woodinville, WA (US); David W. Holmes, Sammamish, WA (US); David K. Smith, Issaquah, WA (US); Christopher A. White, Seattle, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,360

(22) Filed: Aug. 21, 2014

(65) Prior Publication Data

US 2014/0366053 A1 Dec. 11, 2014

Related U.S. Application Data

(62) Division of application No. 10/990,111, filed on Nov. 15, 2004, now Pat. No. 8,850,470.
(Continued)

(51) Int. Cl.
*H04N 7/16* (2011.01)
*H04N 21/258* (2011.01)
(Continued)

(52) U.S. Cl.
CPC . *H04N 21/25816* (2013.01); *H04L 29/06027* (2013.01); *H04L 63/0428* (2013.01);
(Continued)

(58) Field of Classification Search
CPC ....... H04N 21/25816; H04N 21/41407; H04N 21/4126; H04N 21/4182; H04N 21/43637; H04N 21/4402; H04N 21/6131
See application file for complete search history.

(56) References Cited

U.S. PATENT DOCUMENTS

| 5,563,931 A | 10/1996 | Bishop et al. |
| 5,925,101 A | 7/1999 | Bayless et al. |

(Continued)

FOREIGN PATENT DOCUMENTS

| GB | 2384064 A | 7/2003 |
| WO | 0203728 A1 | 1/2002 |
| WO | 03081876 A1 | 10/2003 |

OTHER PUBLICATIONS

Office Action dated Oct. 19, 2011 for U.S. Appl. No. 10/990,111, pp. 1.
(Continued)

*Primary Examiner* — Yassin Alata
(74) *Attorney, Agent, or Firm* — Amin, Turocy & Watson, LLP

(57) ABSTRACT

A personal base station (PBS) having wireless video capability. The PBS authenticates a mobile device within range for cellular services, and authenticates the user for a level of service for cable television. The PBS operates in accordance with a dual-purpose subscriber identity system (SIS) includes a subscriber mobile identity component (SMIC) and a video security component (VSC) such that the cellular and television services can be authenticated. Mobile devices incorporating the disclosed innovations, as well as the PBS, can access video content from a cable television provider through any available broadband link, regardless of the mobile device's physical location.

20 Claims, 11 Drawing Sheets

Related U.S. Application Data

(60) Provisional application No. 60/519,947, filed on Nov. 14, 2003.

(51) Int. Cl.

| | | |
|---|---|---|
| *H04L 29/06* | (2006.01) | |
| *H04N 7/173* | (2011.01) | |
| *H04N 21/41* | (2011.01) | |
| *H04N 21/414* | (2011.01) | |
| *H04N 21/418* | (2011.01) | |
| *H04N 21/4363* | (2011.01) | |
| *H04N 21/4402* | (2011.01) | |
| *H04N 21/61* | (2011.01) | |
| *H04W 12/06* | (2009.01) | |
| *H04W 12/08* | (2009.01) | |
| *H04H 60/14* | (2008.01) | |
| *H04W 88/02* | (2009.01) | |
| *H04W 88/08* | (2009.01) | |
| *H04W 88/10* | (2009.01) | |

(52) U.S. Cl.
CPC ...... *H04L 63/0853* (2013.01); *H04L 65/4084* (2013.01); *H04N 7/17318* (2013.01); *H04N 21/4126* (2013.01); *H04N 21/4182* (2013.01); *H04N 21/41407* (2013.01); *H04N 21/43637* (2013.01); *H04N 21/4402* (2013.01); *H04N 21/6131* (2013.01); *H04W 12/06* (2013.01); *H04W 12/08* (2013.01); *H04H 60/14* (2013.01); *H04W 88/02* (2013.01); *H04W 88/08* (2013.01); *H04W 88/10* (2013.01)

(56) References Cited

U.S. PATENT DOCUMENTS

| 6,040,829 | A | 3/2000 | Croy et al. | |
|---|---|---|---|---|
| 6,125,283 | A | 9/2000 | Ko ev et al. | |
| 6,901,241 | B2 | 5/2005 | Bjorndahl | |
| 7,039,940 | B2 | 5/2006 | Weatherford | |
| 7,058,817 | B1* | 6/2006 | Ellmore | 713/183 |
| 7,062,272 | B2 | 6/2006 | Grilli et al. | |
| 7,218,915 | B2 | 5/2007 | Craven | |
| 7,296,295 | B2 | 11/2007 | Kellerman et al. | |
| 7,366,712 | B2 | 4/2008 | He et al. | |
| 7,444,518 | B1 | 10/2008 | Dharmarajan et al. | |
| 2002/0059614 | A1 | 5/2002 | Lipsanen et al. | |
| 2002/0131404 | A1 | 9/2002 | Mehta et al. | |
| 2002/0151327 | A1 | 10/2002 | Levitt | |
| 2002/0174444 | A1 | 11/2002 | Gatto et al. | |
| 2003/0033610 | A1* | 2/2003 | Takatori | 725/133 |
| 2003/0110382 | A1 | 6/2003 | Leporini et al. | |
| 2003/0139174 | A1 | 7/2003 | Rao | |
| 2003/0139180 | A1 | 7/2003 | McIntosh et al. | |
| 2003/0217122 | A1 | 11/2003 | Roese et al. | |
| 2004/0002359 | A1* | 1/2004 | Deas et al. | 455/556.2 |
| 2004/0081110 | A1 | 4/2004 | Koskimies | |
| 2004/0158850 | A1 | 8/2004 | Karaoguz et al. | |
| 2004/0181602 | A1 | 9/2004 | Fink | |
| 2004/0177375 | A1 | 11/2004 | Caspi et al. | |
| 2004/0190522 | A1 | 11/2004 | Aerrabotu et al. | |
| 2005/0010774 | A1 | 1/2005 | Rose et al. | |
| 2005/0021995 | A1 | 1/2005 | Lal et al. | |
| 2005/0227773 | A1 | 10/2005 | Lu et al. | |
| 2006/0041915 | A1* | 2/2006 | Dimitrova et al. | 725/81 |
| 2006/0080707 | A1 | 4/2006 | Laksono | |
| 2006/0142013 | A1 | 7/2006 | Sayers et al. | |
| 2006/0156365 | A1 | 7/2006 | Zhang et al. | |
| 2007/0136769 | A1 | 7/2007 | Goldberg et al. | |

OTHER PUBLICATIONS

European OA for EP Application No. 04819167.0-1525 dated Feb. 22, 2011. 5 pages.
Office Action dated Apr. 14, 2011 for U.S. Appl. No. 10/990,111, pp. 1.
Office Action dated Apr. 1, 2010 for U.S. Appl. No. I0990106, 46 pages.
International Search Report and Written Opinion dated Apr. 6, 2005 for PCT Application No. PCT|US2004/038472, 13 pages.
International Search Report and Written Opinion dated Apr. 6, 2005, for PCT Application No. PCT/US2004/038194, 14 pages.
OA dated Jan. 2, 2008 for U.S. Appl. No. 10/990,106, 22 pages.
WOEPA OA dated Sep. 11, 2008 for European Patent Application No. 04 819 139.9, 6 pages.
WOEPB OA dated Apr. 24, 2008 for European patent Application No. 04 819 167.0, 5 pages.
OA dated Jul. 11, 2008 for U.S. Appl. No. I0990106, 30 pages.
J. Alonso Maleta. International Search Report, PCTIUS2004/38472. dated Mar. 18, 2005. 4 pages.
J. Alonso Maleta. International Search Report, PCTIUS2004/038194. dated Mar. 18, 2005. 4 pages.
OA dated Nov. 26, 2008 for U.S. Appl. No. 10/990,111, 35 pages.
OA dated Dec. 23, 2009 for U.S. Appl. No. 10/990,111, 34 pages.
OA dated May 19, 2009 for U.S. Appl. No. 10/990,111, 27 pages.
OA dated Jun. 10, 2008 for U.S. Appl. No. 10/990,111, 28 pages.

* cited by examiner

PERSONAL BASE STATION SYSTEM WITH WIRELESS VIDEO CAPABILITY

CROSS-REFERENCE TO RELATED APPLICATIONS

This application is a divisional of, and claims priority to each of, U.S. patent application Ser. No. 10/990,111 (now U.S. Pat. No. 8,850,470), entitled "PERSONAL BASE STATION SYSTEM WITH WIRELESS VIDEO CAPABILITY", filed on Nov. 15, 2004, which claims priority to U.S. Provisional Patent Application Ser. No. 60/519,947 entitled "PERSONAL BASE STATION WITH WIRELESS VIDEO CAPABILITY" filed Nov. 14, 2003. The entireties of the foregoing applications listed herein are hereby incorporated by reference.

TECHNICAL FIELD

This disclosure is related to ubiquitous provision of multimedia services to subscribers of mobile communication services and, more particularly, to subscriber information modules for portable multimedia permissions.

BACKGROUND

The advent of global communication networks, such as the Internet, have brought to the forefront capabilities heretofore considered unthinkable, or at least, impracticable. What was at one time a mechanism for rudimentary data exchange has evolved, and continues to evolve into a means for distributing a wide variety of media.

One particular industry that continues to leverage the capabilities of the Internet involves, in general, multimedia messaging services, and in particular, the application of such services to mobile devices, e.g., cellular telephones. Multimedia is generally considered a disparate collection of technologies that encompass audio, video, text, graphics, facsimile, and telephony, an assorted combination of which provides a rich and more powerful communication experience then does a single media, such as simply a text-based communication. However, convergence of multimedia services for use in mobile devices introduces huge bandwidth concerns that require more sophisticated software and hardware solutions in the device and the associated networks, and which come at increased costs for the consumer.

The demand on the existing infrastructure for providing such high-bandwidth capabilities, especially with respect to video, continues to be a problem as vendors struggle to provide their own networks over which such mobile multimedia devices can operate. Mobile infrastructure vendors have to provide mobile video servers and gateways in their product portfolios to support high-end telephones with such video capabilities. These costs are then passed on to the consumer who subscribes to the particular vendor's mobile telephone service, and which service typically suffers from wireless channel bandwidth limitations that prohibit a large number of customers from benefiting from such technology.

Many households today are served by cable or satellite television providers. Subscribers pay for access to a subset of channels offered by the provider. For example, a cable provider might offer a basic cable subscription and a premium cable subscription, the premium subscription granting access to more television channels. Access to these channels is generally controlled by a cable or satellite decoder box located at the subscriber's premises. Mobile video devices, however, are unable to access cable television because they are not physically connected to the subscriber's decoder box and there is no convenient way to verify that a mobile device should be permitted to access the cable system content.

What is needed are improved devices and systems for facilitating the use of mobile multimedia devices and access to subscription content regardless of location.

DETAILED DESCRIPTION

Figure 1:
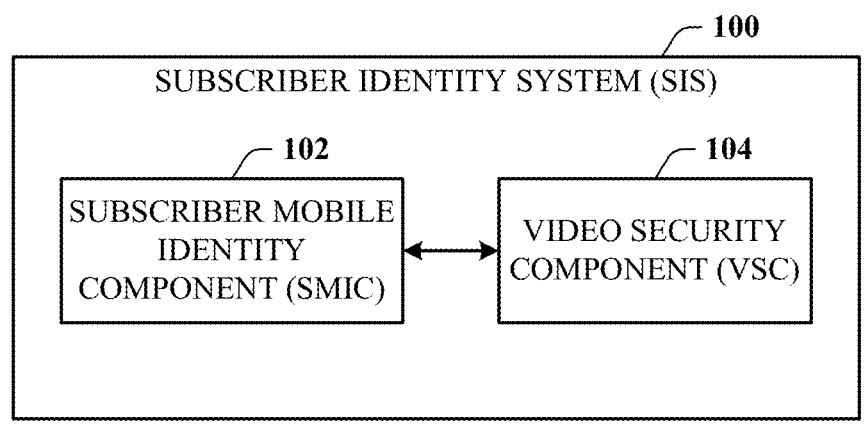
FIG. 1 illustrates a subscriber identity system (SIS) in accordance with the present disclosure.

The present disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details. In other instances, well-known structures and devices are shown in block diagram form in order to facilitate describing the present disclosure.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

GSM (Global System for Mobile Communications) telephones comprise either a subscriber identity module (a "SIM" card) or a universal SIM (a "USIM" card) that is used for authenticating cellular subscription for a mobile communication device.

Recent advances between television (TV) manufacturers and cable TV companies provide that a television will no longer be required to operate with an external cable converter box or satellite tuner, but will have such capabilities designed into the TV. The purpose of the cable converter box and satellite tuner is to allow the cable company to control what the subscriber is allowed to see based upon the associated subscription level. In such an implementation, in order for the cable companies to maintain control over content delivered to the TV, a digital security card is employed in the TV that sets forth the terms and subscription details for a given subscriber. Even if the cable box or satellite tuner is built into the TV, the subscriber must purchase the card from the cable company or have a preinstalled card or circuit configured (or activated) to allow access to the subscriber levels of service.

The present disclosure, in one aspect thereof, is a subscriber identity system (SIS) (e.g., the U/SIM card or U/SIM circuit module) that comprises both the functionality of the U/SIM card for authenticating a cellular telephone subscription, as well as a television digital security card for use in identifying a subscriber of a delivered broadband multimedia service. In this way, a cell phone, for example, can embody the permissions for receiving cable content, such as television or music. In one example, if a subscriber is at an airport and desires to download multimedia content to the cell phone, the phone already has the access capability and rights to pull content from the Internet based on the subscriber's cable subscription. Thus, in this example, the subscriber could access cable television on his mobile device while at the airport according to what his subscription permits. The SIS can be employed with other suitably capable mobile devices such as a personal data assistant (PDA), portable computers, tablet computers, for example, and even non-portable systems.

In another aspect thereof, the SIS capability is employed in a personal base station (PBS) such that a subscriber can be authenticated for the receipt of multimedia services via the PBS. Such capability can be provided by a slot-in interface where the SIS is in the form of a card that the user inserts into the PBS. Alternatively, the SIS can be provided as a downloadable software system that is installable in firmware in the PBS after purchase, or installed by a reseller as part of the purchase transaction. In another aspect of the present disclosure, the PBS employs wireless video capability.

In yet another aspect thereof, the SIS is employed in a PBS that interfaces to a broadband network interface device such that a subscriber can be authenticated for the receipt of multimedia services via the broadband infrastructure.

In still another aspect thereof, the SIS is employed in a mobile device such as a cellular telephone. A subscriber in a roaming status can then be authenticated via a public base station system (e.g., a wireless transceiver according to IEEE 802.11) that interfaces to a broadband network such that the mobile device can receive and process multimedia services for presentation to the user.

Referring now to FIG. 1, there is illustrated a subscriber identity system (SIS) 100 in accordance with the present disclosure. The SIS 100 facilitates the convergence of mobile technology with digital television technology such that the user can receive digital video content on a mobile device. The SIS 100 is uniquely tied to a subscriber, unlike a device or a handset. Because a subscription operator (or provider of the subscribed services) programs system information into the SIS 100, the operator can correlate requested services with the identity of the subscriber and has an established billing relationship with the subscriber, as well as enhanced access to other subscriber information such as the subscriber location, for example. Identification of the user can be used for many applications, including payments, logins, digital identity, etc.

In support thereof, the SIS 100 includes both a subscriber mobile identity component (SMIC) 102 and a video (or other multimedia) security component (VSC) 104. The SMIC 102 includes subscriber data related to the subscription, identification, and use of a mobile device, e.g., a cellular telephone, a PDA, or other mobile computing and telephony-capable devices, such as a personal computer having a wireless card. The SMIC 102 also facilitates subscriber authentication and privacy (e.g., encryption) for mobile communications. Such features are conventionally associated with a SIM (Subscriber Identity Module) card and universal SIM (USIM) card, the combined technologies of which will be designated hereinafter as U/SIM. Current SIM technology is according to a technical specification 3GPP TS 51.011, Technical Specification of the Subscriber Identity Module—Mobile Equipment (SIM-ME) interface, by the $3^{rd}$ Generation Partnership Project (3GPP), and current USIM technology is according to technical specification 3GPP TS 31.102, Technical Specification Group Terminals, Characteristics of the USIM Application, by the $3^{rd}$ Generation Partnership Project, both of which are incorporated by reference.

The VSC 104 comprises subscriber information related to the subscription of cable or satellite television content, such as level-of-subscription data (e.g., channel packages such as basic channels, pay-per-view channels, and premium channels), subscriber ID, and other related personal information. This can also include DRM (Digital Rights Management) information, which is the digital management of all rights, not only the rights applicable to permission for accessing digital content. A principal goal of DRM is to prevent the unauthorized exploitation of content. DRM not only focuses on security and encryption as a means of solving the issue of unauthorized copying (by locking the content and limiting distribution to only paying subscribers), but also covers the description, identification, trading, protection, monitoring and tracking of all forms of rights usages over both tangible and intangible assets including the management of relationships between holders of the rights.

Figure 2:
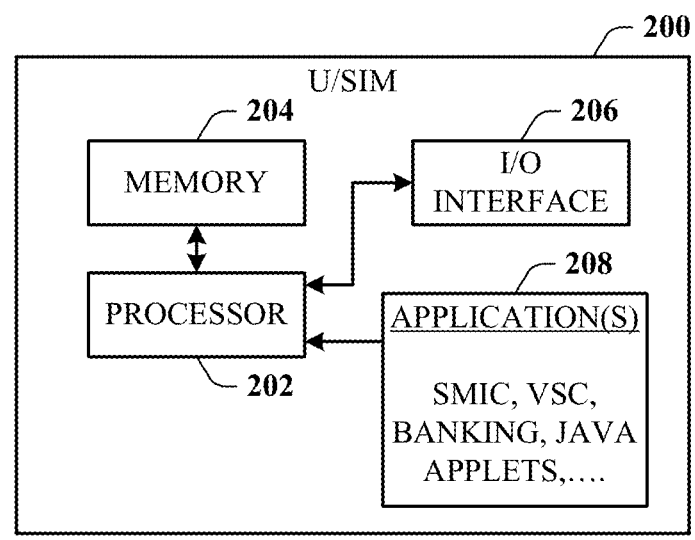
FIG. 2 illustrates an implementation of the SIS of FIG. 1 in the form of a module in accordance with the present disclosure.

Referring now to FIG. 2, there is illustrated an implementation of the SIS 100 of FIG. 1 in the form of a module in accordance with the present disclosure. A U/SIM module 200 is designed to accommodate at least details and features expressed in the technical specifications for conventional U/SIM cards, plus the functionality provided by the VSC 104 of FIG. 1. The U/SIM module capabilities can be provided in the form factor of a smart card that a user inserts into a device via a slot-in interface, or that resides internal to the device with a basic configuration upon purchase. Alternatively, or in combination with the smart card approach, some or all of the module capabilities can be designed into logic integrated into the system board of the device.

The module 200 includes a processor 202 for controlling and processing all onboard applications, signals, and data, as well as, signals and data communicated therebetween with external systems, such as the signals and data of the device into which the module 200 is implemented. The module 200 also includes a memory 204 for storing applications and data for execution and processing during normal operation. The module 200 also includes an Input/Output (I/O) interface 206 that facilitates the hardware and software interface required for utilization.

Additionally, the module 200 includes one or more applications 208 stored in the memory 204 or in a programmable memory that can run simultaneously. Such applications 208 can include, but are not limited to, a digital video access security component application ("VSC application"), GSM/GPRS (General Packet Radio Service) application, Enhanced Data for GSM Evolution (EDGE) application, DRM application, banking applications, and Java applets. GPRS represents the first implementation of packet switching within GSM, which is a circuit switched technology, and offers theoretical data speeds of up to 115 k bps using multi-slot techniques. GPRS and EDGE are precursors for 3G (3rd Generation) mobile communications as it introduces the packet-switched core required for UMTS (Universal Mobile Telecommunications System), a 3G advanced mobile communication scheme. Wireless communication schemes compatible with the disclosed innovations include, but are not limited to, IS-95 Code Division Multiple Access (IS-95 CDMA), IEEE 802.11 Wireless Local Area Network (802.11 WLAN), CDMA2000, Wideband CDMA (aka UMTS), IEEE 802.20, IEEE 802.16, and Bluetooth.

A UICC (Universal Integrated Circuit Card) is one platform that can be used for combining the SMIC and VSC functions in the form of applications. Unlike the GSM SIM (or 2G SIM), the 3G UICC is a true multi-application card, and can host the VSC application for digital video access similar to the way that it hosts separate applications for the following, for example: GSM/GPRS services; banking applications; and Java applets. The VSC application is independent of an SMIC application, but can invoke the SMIC application for at least billing purposes. The UUIC card can also store DRM tokens that are passed using the onboard DRM application. The VSC application interacts with the DRM application to enable viewing restricted multimedia content. One advantage of this approach is that at least three separate applications (DRM, VSC for video access, and SMIC for GSM access) which are useful for viewing and billing of the video content, are all hosted in one place—the UUIC smart card, or embodied in SIS logic in the phone, for example, and all interacting with one another internally, without the need for numerous over-the-air interfaces.

Although the discussion of FIG. 2 focused on the scenario where the mobile communication provider owns the relationship with the subscriber, the reverse scenario can also use embodiments of the disclosure. In the reverse scenario, the broadband service provider (e.g., cable television provider, ISP, etc.) owns the customer relationship. For example, the cable television provider can provide a package of services to the subscriber that includes broadband services (television, internet access, etc.) and cellular phone service. Thus, in this reverse scenario, subscriber billing information can be accessed by invoking the VSC application, and the SMIC application can be invoked for cellular registration/authentication procedures.

Figure 3:
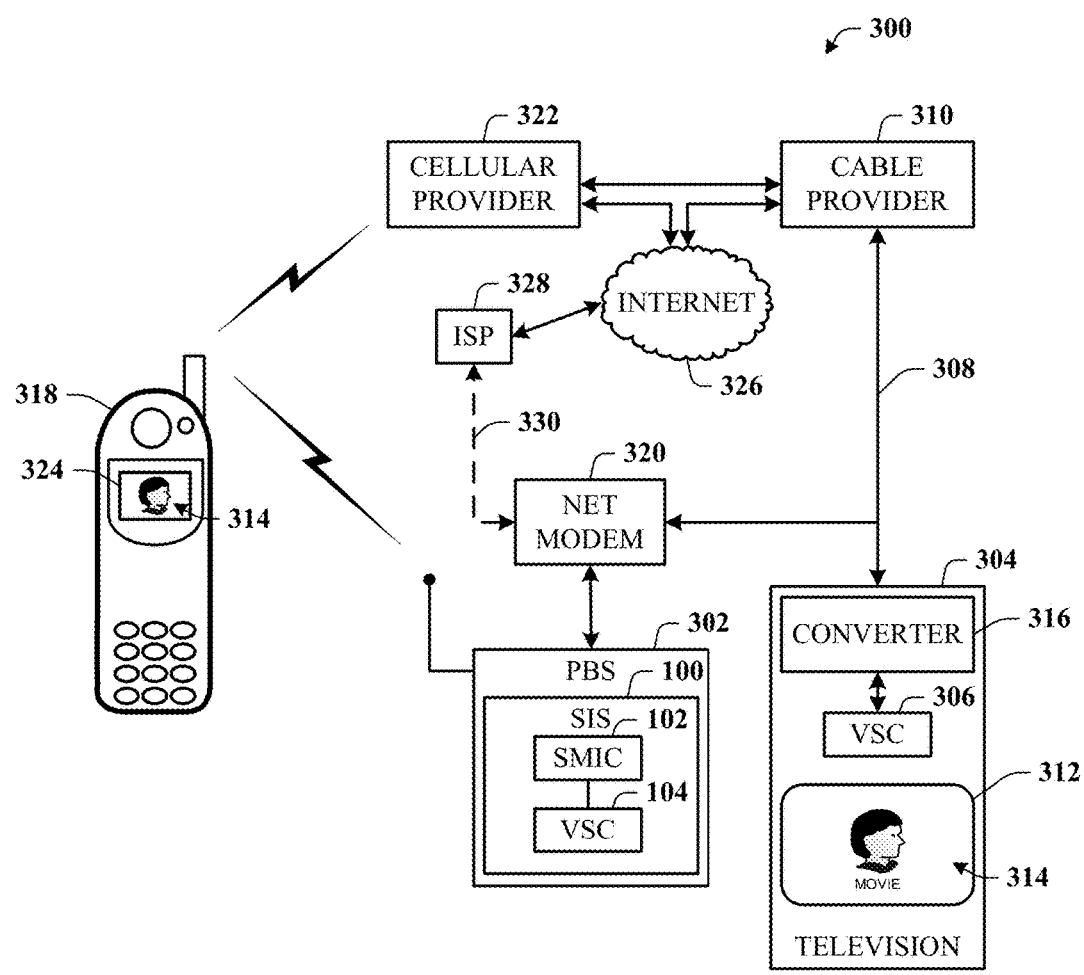
FIG. 3 illustrates a block diagram of a system where the SIS of FIG. 1 is disposed in a PBS to facilitate content presentation in accordance with the present disclosure.

Referring now to FIG. 3, there is illustrated a block diagram of a system 300 where the SIS 100 of FIG. 1 is disposed in a PBS 302 to facilitate content presentation in accordance with the present disclosure. A television 304 (broadcast video receiving system) includes a VSC 306 (similar to VSC 104 of FIG. 1) for registering the user (a cable subscriber, in this aspect) over a cable connection communication medium 308 with a cable provider (or operator) 310. The television 304 also includes at least a monitor or display (e.g., tube-based, plasma, or LCD panel) 312 for presenting at least audio and video content 314 for which the user has subscribed.

The VSC 306 interfaces to video signal converter circuitry 316 internal to the television 304 such that some channels received at the converter 316 from the cable provider 310 are selectively filtered or blocked from viewing at the television 304 in accordance with the level of service subscribed to by the user. The VSC 306 contains at least this cable subscription information, which information is processed locally to control which channels are allowed for viewing. Note that the converter 316 can be an external implementation such that the VSC 306 communicates therewith to unlock the level of services of the cable subscriber. Of course, the VSC 306 and the converter 316 can be manufactured as a single unit internal and/or external to the television 304 to provide the same functions.

The PBS 302 includes the SIS 100 to facilitate registering a compatible mobile communication device 318 of the user when the user brings the mobile device 318 within a range suitable for performing the registration process. Registration is performed wirelessly using the SMIC 102, and is an authentication process that uniquely identifies the mobile device 318 as associated with the PBS 302. Once authenticated, the mobile device 318 can receive additional subscribed cellular services.

The PBS 302 is connected to a network modem 320, here, a cable modem, to facilitate IP services subscribed to by the user. Once the SMIC 102 signals the VSC 104 that registration is successful, the VSC 104 initiates signaling of the cable provider 310 that IP services can now be transmitted for processing. Such IP services include all Internet-related content, activities, and services, e.g., browsing web sites, checking e-mail, downloading multimedia content, and processing VoIP (Voice over IP) services, to name just a few. The registration process further includes the PBS 302 and/or the mobile device 318 signaling a cellular provider 322 that the mobile device 318 has registered with the PBS 302 and that phone calls and/or data intended for the mobile device 318 should be forwarded to the PBS 302.

The mobile device 318 signals the cellular provider 322 using normal wireless communications. The PBS 302 can signal the cellular provider 322 in any of a number of ways: wirelessly, directly to the cellular provider 322, in a manner similar to communications made by the mobile device 318; through the net modem 320, cable provider 310, and to the cellular provider 322; and, through the net modem 320, an ISP (Internet Service Provider) 328, the Internet 326, and to the cellular provider 322. This change in status is one trigger mechanism that can be employed to initiate downloading of the content 314 to the mobile device 318 in accordance with the present disclosure.

In operation, the user arrives home and the mobile device 318 is automatically or manually registered when brought within a suitable range of the PBS 302. Before, during, or after the registration process, the cellular provider 322 is signaled (by the mobile device 318, for example) that the mobile phone 318 should be transitioned to the offline status. Once the phone 318 is successfully registered, the SMIC 102 and VSC 104 communicate to allow the PBS 302 to access restricted multimedia content, and transmit the content to the mobile device 318 for presentation to the user. This can occur, for example, using a key or token that is passed from the SMIC 102 to the VSC 104 that can be used to download decoded content 314 to the PBS 302. The PBS 302 then forwards the content 314 to the mobile device 318 for presentation via a display 324. The user is then free to roam the house and perceive the content 314 via the mobile device 318 (or any other portable device capable of implementing the novel features disclosed herein).

In one implementation, the decoded content 314 is transmitted directly to the PBS 302 from the cable provider 310. In another implementation, decoding is performed locally by the television 304 such that the VSC 104 signals the television 304, and the television converter 316 transmits the decoded content 314 to the PBS 302 via the net modem 320, and therefrom, to the mobile device 318. In still another implementation, the decoding occurs at the PBS 302. The PBS 302 can then wirelessly transmit the decoded content 314 to mobile device 318 (or multiple mobile or wireless devices) that have registered with PBS 302, and that have proper authorization. In yet another implementation, the mobile device 318 includes the capability to perform decoding of the content, such that the coded content is received at the PBS 302 and forwarded to the device 318 for decoding and presentation.

The downloading and viewing process can be initiated by employing the SIS 100 in the form of a card that is compatible for insertion into a slot of the PBS 302 by the user. Once inserted, the registration process can begin, the transitioning can occur to offline status, and the downloading of multimedia content to the mobile device 318 for viewing. Alternatively, the SIS 100 is manufactured into the PBS 302, and configured by the cellular company and/or the cable company for use by the subscriber.

In accordance with conventional systems, the user can subscribe to Internet access using the network modem 320. In the case where Internet access is provided by the cable company, the network modem 320 is a cable modem provided by the cable provider 310 that connects to the cable connection 308 to process IP (Internet Protocol) data packets forwarded through the cable provider 310 from the Internet 326. The user can have one or more home computers (not shown) suitably configured to connect to the cable modem for interaction with services provided by the Internet 326.

If the user subscribes to Internet access through the ISP 328 that is not the cable provider 310, the net modem 320 is a DSL (Digital Subscriber Line) or ATM-type (Asynchronous Transfer Mode) modem, for example, that interfaces to the Internet 326 over a connection 330 (shown as a dashed line, as an alternative or optional solution) through the ISP 328. In this particular implementation, the VSC 104 signals the cable provider 310 via the ISP 328. The content is then routed from cable provider 310 over the Internet 326, through the ISP 328 to the DSL or ATM-type modem, and ultimately to the mobile device 318 via the PBS 302. This can then be decoded content such that the converter 316 is not required to decode the content.

Where VoIP is a subscribed service with the cable company, after the device registers and moves to the local status, the cellular provider 322 routes incoming or outgoing calls through the cable provider 310. The calls are received over the network 308 by the net modem 320, now a cable modem, and processed by the PBS 302. The PBS 302 processes and forwards the VoIP traffic to the mobile device 318 so that the user can then use the mobile device 318 to converse with the caller, or call out utilizing VoIP to a callee. Again, this can also be facilitated through ISP 328 that is not the cable provider 310, where the net modem 320 is now a broadband modem, e.g., DSL or ATM-type modem, for example. Thus, the capability for transmitting voice conversations over the Internet 326 is made available using a broadband connection to the PBS 302 and the mobile device 318 (or any suitably designed mobile device). Note that the mobile device 318 can also embody the SMIC; however, this is not required.

Figure 4:
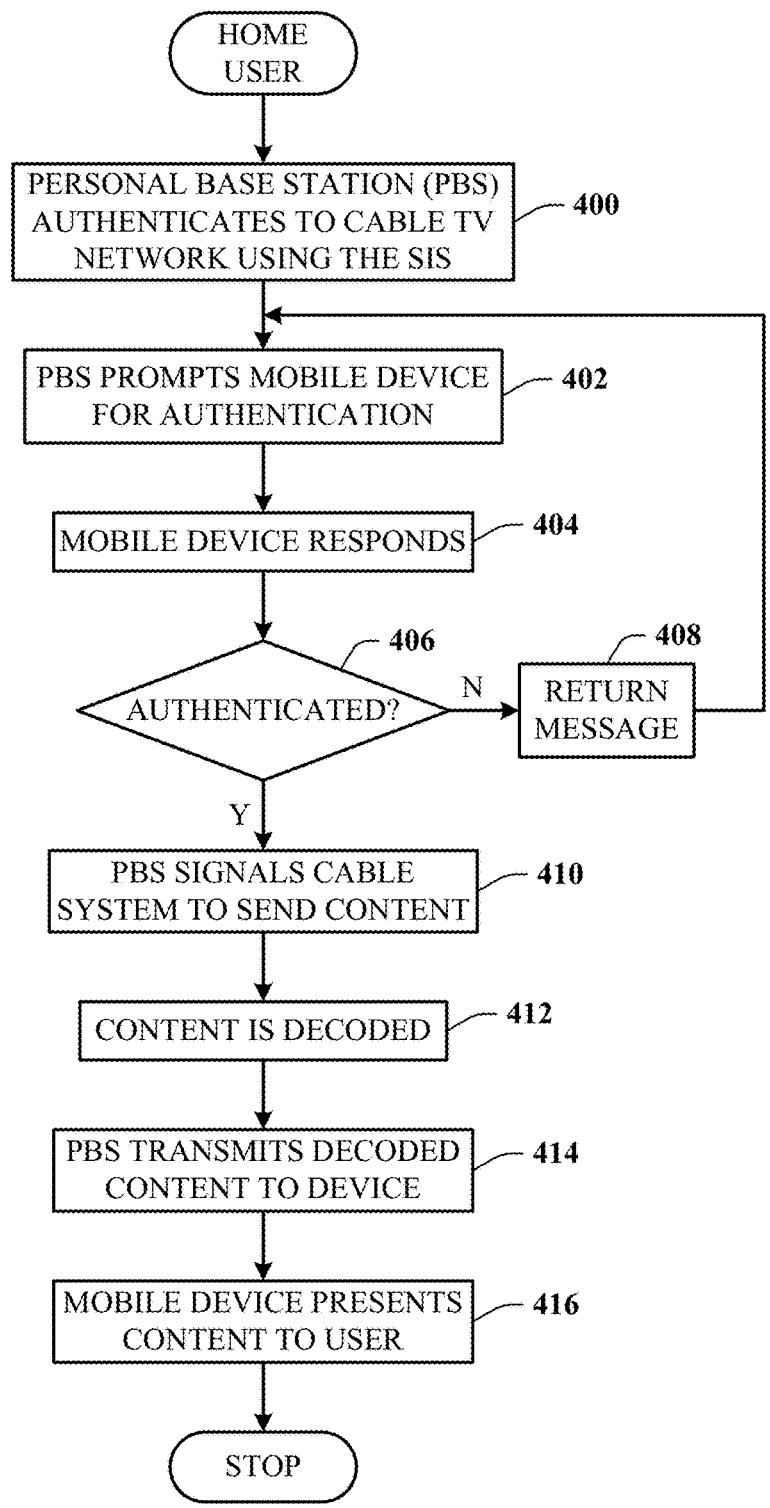
FIG. 4 illustrates a flow chart of a process for automatic configuration of the cellular system for receiving multimedia content.

Referring now to FIG. 4, there is illustrated a flow chart of a process for automatic configuration of the cellular system for receiving multimedia content. While, for purposes of simplicity of explanation, the one or more methodologies shown herein, e.g., in the form of a flow chart, are shown and described as a series of acts, it is to be understood and appreciated that the present disclosure is not limited by the order of acts, as some acts may, in accordance with the present disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present disclosure.

At 400, the PBS authenticates to the cable TV system in preparation for receiving multimedia content. This is facilitated by the SIS where the SMIC and the VSC communicate such that the level of subscription for the telephone service (e.g., multimedia download) is ascertained and enabled. At 402, the PBS prompts the mobile device, e.g., a cellular telephone, during a registration process that includes authentication. At 404, the mobile device responds. At 406, the PBS determines if the response indicates successful authentication. If NO, flow is to 408 to return a message to the user that authentication has failed. Flow is then back to the input of 402 to reinitiate the device authentication process according to a predetermined number of attempts. If YES, authentication is successful, and flow is from 406 to 410 where the PBS allows the mobile to have access to the cable TV multimedia content. At 412, the content is decoded. Decoding can occur at a number of locations, e.g., at the cable provider and at the television by the television converter. At 414, the PBS transmits the decoded content to the device, and at 416, the device presents the content.

Figure 5:
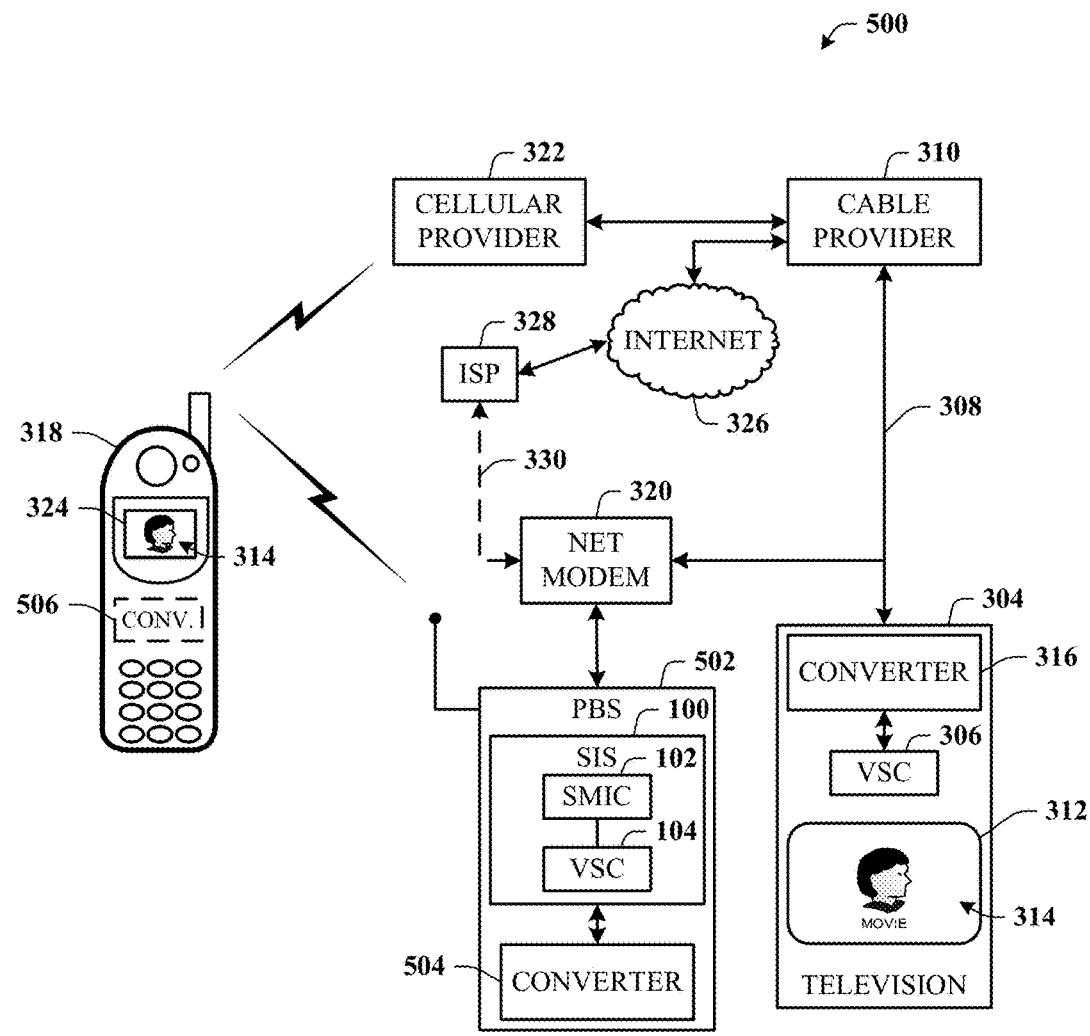
FIG. 5 illustrates a block diagram of a system where the SIS of FIG. 1 is disposed in a PBS along with a converter to facilitate content presentation in accordance with the present disclosure.

Referring now to FIG. 5, there is illustrated a block diagram of a system 500 where the SIS 100 of FIG. 1 is disposed in a PBS 502 along with a converter 504 to facilitate content presentation in accordance with the present disclosure. In this implementation, the PBS 502 can receive encoded video data directly from the cable provider 310, decode and/or reformat the video stream into a video compression scheme, e.g., MPEG, that is suitable for transmitting full motion video over a lower bandwidth link to the mobile device 318. All other aspects described in FIG. 3 also apply in this implementation, but are not described here for purposes of brevity.

It is to be appreciated that where the PBS 502 includes the converter 504, the user does not need the television 304 with TV converter 316 (either internal or external) to view any content, since the PBS 504 accommodates decoding of the content for presentation by mobile device 318 (or other suitably capable portable device).

It is further to be appreciated that where the mobile device 318 includes a converter 506, the PBS 502 can forward encoded video data directly thereto. The user does not need the television 304 with TV converter 316 (either internal or external) to view any content, since the mobile device 318 decodes of the content for presentation.

Note that the service could be extended "outside" the PBS 502 by enabling the PBS 502 to also re-code the decoded video stream to a low rate and function as a streaming server that the user can access for video via GPRS/EGPRS (extended GPRS), for example. This way, the user provides their own streaming video from their own node for the programming they want to view. This can be considered an interim solution until the broadcasters provide streaming feeds. This is also useful for viewing material from home that is stored remotely in non-real time mode, for example, a digital recorder storage unit capable of storing movies, songs, etc.

Note that since the PBS 502 includes the converter 504 and a compression encoding algorithm, the PBS 502 could transmit the video content to any suitable device configured to receive it (e.g., with an external receiver, where necessary) and present such information via a TV, stereo, laptop computer, and kitchen appliance, for example. Moreover, the PBS 502 could employ multiple "tuners", each one paired to a given wireless receiver (or perhaps paired via a registration procedure, similar to Bluetooth or SCSI IDs). The PBS 502 could also utilize Bluetooth or IEEE 802.11 to obtain decoded video content from the cable converter 316. The PBS 502 can check the capabilities of the mobile device 318 and convert the video stream to an appropriate resolution, for example, for presentation by the mobile device display 324.

Where the PBS 502 functions as a master cable box, the receiving wireless device does not need to be a telephone or PDA, but can be a low profile device for semi-fixed installation. This has the benefit of not having to route cable wires throughout the house or building, and provides "mobility" for even fixed devices such as televisions and stereos (for cable music feeds).

Another implementation uses the PBS 502 to locally manage content. For instance, prerecorded digital content can be automatically downloaded to a portable viewer through the household network. The PBS 502 then takes the content and reformats it using a suitable video compression algorithm (e.g., MPEG-4), and sends it to a PDA or portable video player, which can either be physically connected to the PBS 502, or tethered to it through a telephone (via cable or Bluetooth). The content can then be watched at a remote location or in the future. If a broadband connection is not available the content could be "trickled" to the recipient device, perhaps overnight while the subscriber is sleeping, or as a background process while the subscriber is using the device, for example.

The PBS 502 can also facilitate reviewing cable subscription information using the display 324 of the mobile or remote computing device 318.

In another implementation, the disclosed architecture can be employed as a remote authorization/parental control feature. A parent can control a child's phone or game deck by entering specific information about the child's 'personal' subscription into the SIS (e.g., no more than one hour of Cartoon Network/day, one hour of on-line gaming/day, etc.). The parent's wireless device can be used as an authorization device for video viewing, for instance, for pay-per-view or for restricted shows. This allows the parent to control viewing of content even when the parent is not at home. The mobile device 318 can also be paired to a tuner, so that there is a default set of permissions enabled when the mobile device 318 is away (or out of range), and a superset of permissions when the device 318 is present.

The SIS facilitates inter-application communication. For example, the VSC can exchange a token with the SMIC application on the card, which SMIC application then transmits (or stores and forwards) the token to a backoffice system for tracking and billing. This can also be transmitted over the cellular system or via a short range RF to the PBS 502, which would then forward it over the broadband connection to the cellular backoffice. A revenue-sharing scheme can be introduced for ordering pay-per-view movies/events via the mobile subscription. The movies would get charged to the customer's mobile account. The wireless carrier would then remit part of the charges to the pay-per-view video provider. The VSC is independent of the SMIC application, but can invoke the SMIC application for billing purposes.

The PBS 502 also facilitates receiving a data locally, and then transporting a data session to either another device or to one or more nodes on the Internet. This allows, for example, multi-player gaming from the wireless device, either locally through the house or to the Internet over the broadband connection.

The disclosed architecture provides a telephone service 'retrofit' feature where the PBS 502 can be used to replace the wire connection to the local loop by wirelessly transmitting VoIP to cordless phones (in addition to cellular phones) that are paired with it. A low profile device can be attached to a cordless phone base station to retrofit the existing cordless phone. The customer would no longer need a PSTN (Public Switched Telephone Network) connection. All cordless calls would go through broadband connection via VoIP, essentially providing Internet access to standard cordless phones.

As indicated previously, one advantage of having the television subscription information in the SIS (as the VSC application) is that the subscriber can receive digital television signal at locations other than the subscriber's home. For example, if the subscriber is visiting a neighbor that has the PBS 502, the visiting subscriber can receive the television feed directly from the neighbor's PBS, but the dual-use SIS will ensure correct billing and authentication. In essence, the disclosed architecture can provide mobility to cable operators.

Figure 6:
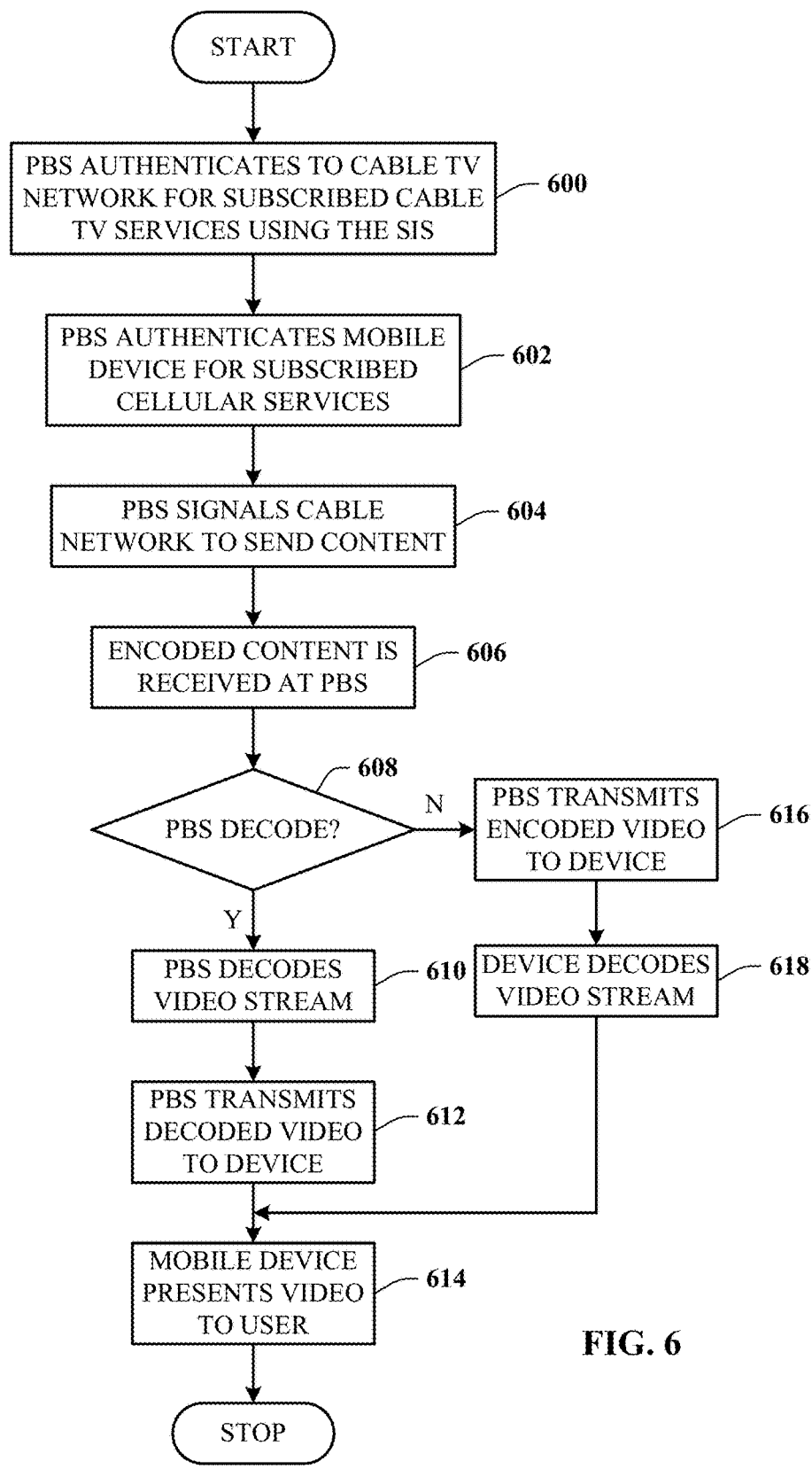
FIG. 6 illustrates a flow chart of a process for automatic configuration of the cellular system for receiving and decoding multimedia content at the PBS or the mobile device.

Referring now to FIG. 6, there is illustrated a flow chart of a process for automatic configuration of the cellular system for receiving and decoding multimedia content at the PBS or the mobile device. At 600, the PBS authenticates to the cable TV network for subscribed cable TV services, using the SIS system. At 602, the PBS authenticates the mobile device for subscribed services; the mobile device is, for example, a cellular telephone having cellular services associated therewith. At 604, the PBS allows access to (or signals the cable network to send) the requested multimedia content. At 606, the encoded content is received by the PBS. At 608, a determination is made whether to decode the video stream at the PBS. If YES, flow is to 610 where the PBS decodes the video stream. At 612, the PBS transmits the decoded multimedia content to the mobile device for processing. At 614, the content is presented to the user using the device.

Alternatively, if decoding is not to occur at the PBS, decoding will be performed by the mobile device. Thus, flow is from 608 to 616 where the PBS transmits the encoded content to the mobile device. At 618, the mobile device then decodes the video stream. Again, at 614, the multimedia content is presented to the user using the device.

Figure 7:
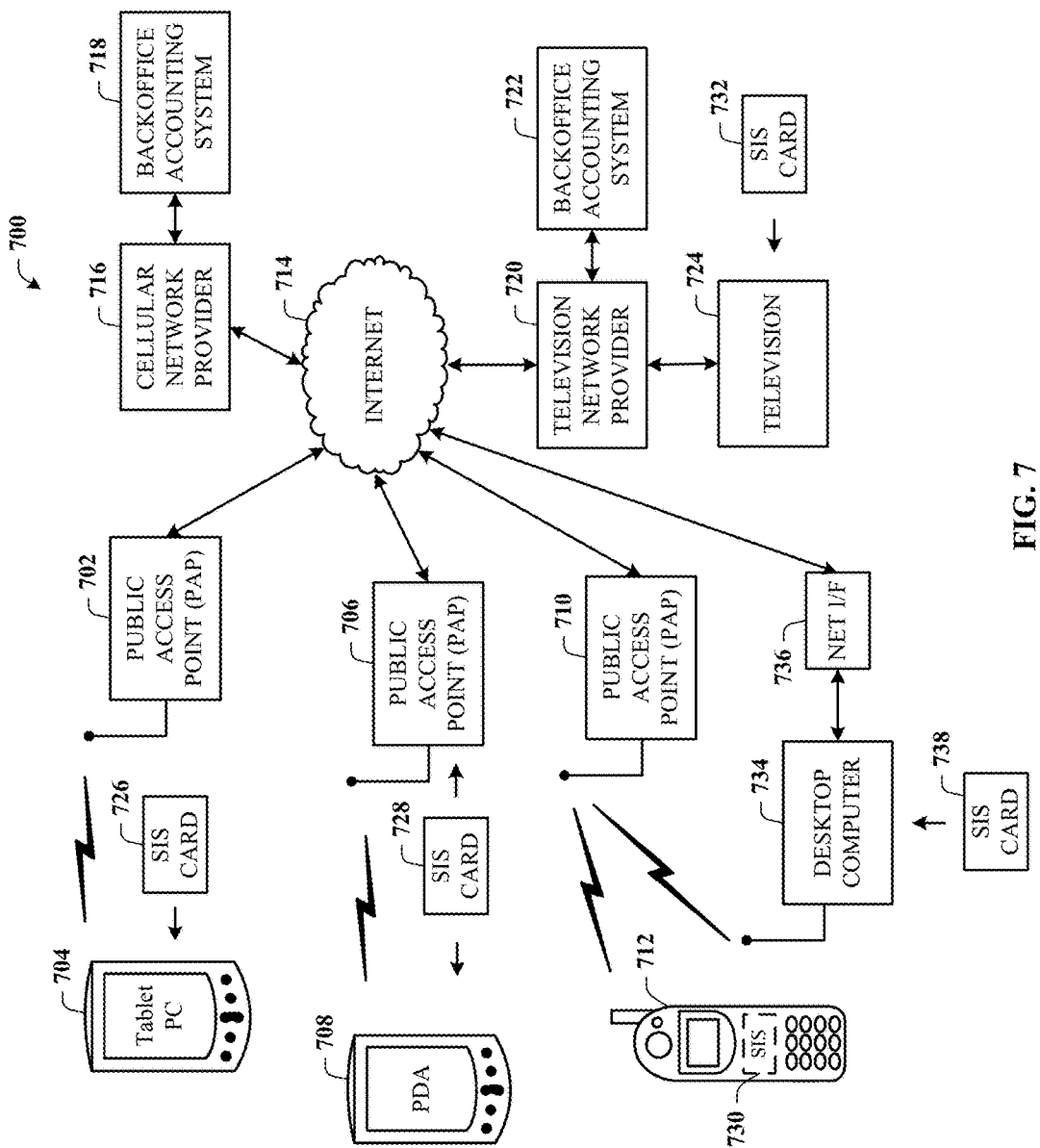
FIG. 7 illustrates a public system that facilitates content presentation with a mobile device in accordance with the present disclosure.

Referring now to FIG. 7, there is illustrated a public system 700 that facilitates content presentation with a mobile device in accordance with the present disclosure. As indicated previously, the mobile device can comprise a number of different portable computing devices. In one embodiment, the system 700 is implemented at an airport or other public place, such as a library or university, for example. The system includes one or more public access points (PAP) that facilitate wireless and/or wired communication of IP traffic with a number of portable devices. In the example shown, the system 700 includes a first PAP 702 for communicating with a tablet computer 704 that includes telephony capability; a second PAP 706 for communicating with a PDA 708 that includes telephony capability; and, a third PAP 710 for communicating with a cellular telephone 712. The PAPs (702, 706, and 710) are disposed on a global communication network such as the Internet 714.

Additionally, a cellular provider 716 is a node on the Internet 714 to provide access to cellular IP services for those cellular subscribers that can access the Internet 714. The cellular provider 716 also has an associated backoffice accounting system 718 that tracks and stores subscriber cellular usage, subscriber cellular IP usage, billing information, etc., so that the cellular user can be billed for all subscribed services.

A television network provider 720 is also disposed on the Internet 714 to provide television content to digital television subscribers. The television network provider 720 also has an associated backoffice accounting system 722 that tracks and stores subscriber television usage, subscriber cable IP usage, billing information, etc., so that the television user can be billed for all subscribed services. The system 700 can also include one or more televisions 724 connected to the television provider 720 (e.g., a cable TV operator) such that an airport can provide video content at the airport.

In operation, a computer user brings the tablet (i.e., portable) computer 704 within range of the first PAP 702. In response, authentication and/or registration is performed between the tablet computer 704 and the first PAP 702. As indicated hereinabove in accordance with the present disclosure, the first SIS card 726 includes the SMIC/VSC modules that allow authentication to both the cellular provider 716 and the television network provider 720 for the download and use of subscribed services via the tablet computer 704. If successfully authenticated, multimedia content can be processed and presented by the tablet computer 704 via the first PAP 702, as well as incoming and outgoing cellular calls using VoIP.

Similarly, a PDA user brings the PDA 708 within range of the second PAP 706. In response thereto, authentication is performed between the PDA 708 and the second PAP 706. The second SIS card 728 allows authentication to both the cellular provider 716 and the television network provider 720 for the download and use of subscribed services via the PDA 708. If successfully authenticated, multimedia content can be processed and presented by the PDA 708 via the second PAP 706, as well as incoming and outgoing cellular calls using VoIP. Note that in any case, the user can insert the SIS card into a PAP to initiate the desired services. As an alternative, the user can insert the second SIS card 728 into the second PAP 706 in order to receive the subscribed cellular and/or digital television services.

A cellular telephone user brings the cellular telephone 712 within range of the third PAP 710. In this example, the telephone 712 already includes a third SIS module 730. The third SIS module 730 allows authentication to both the cellular provider 716 and the television network provider 720 for the download and use of subscribed services via the telephone 712. If successfully authenticated, multimedia content can be processed and presented by the telephone 712 via the third PAP 710, as well as incoming and outgoing cellular calls using VoIP.

In another implementation of the present disclosure, the user can simply insert a fourth SIS card 732 into the airport television 724, and receive subscribed cable television content. Once the card 732 is removed, the viewing content defaults back to a configuration provided by the airport.

Note that the disclosed architecture is not limited to only portable computing devices, but can also be employed with computing devices typically considered to be non-portable, for example, a desktop computer 734 provided at the airport, work or at home, or a rack mounted piece of equipment designed with computing capabilities and, cellular and cable television access to facilitate content and conversation presentation in accordance with the present disclosure. Here, the airport desktop computer 734 communicates wirelessly with the third PAP 710, or can communicate directly with the Internet 714 via a wired network interface device 736. In any case, if a user inserts a fifth SIS card 738 into the computer 734, authentication is again performed for both subscribed cellular and digital television services. If authenticated successfully, multimedia content can be downloaded, processed and presented using the computer 734 (a speaker system) via the third PAP 710, as well as incoming and outgoing cellular calls using VoIP (and a microphone and the speaker system).

Each of the PAPs (702, 706, and 710) is capable of communicating with multiple like or different mobile and/or no-portable devices substantially simultaneously to provide the desired subscriber content to the connected users.

Figure 8:
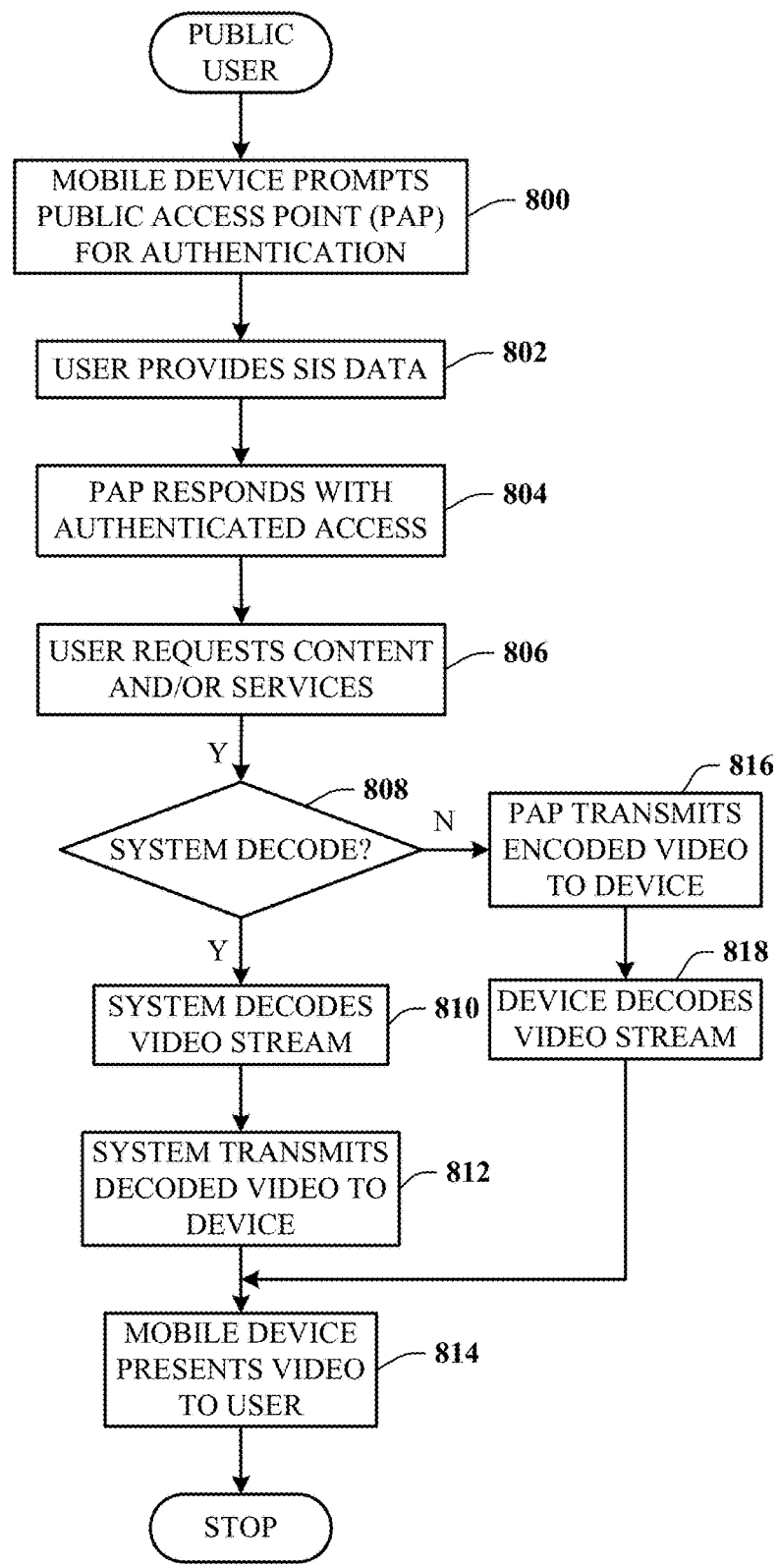
FIG. 8 illustrates a flow chart of a process for implementation of a public system for accommodating mobile devices in accordance with the present disclosure.

Referring now to FIG. 8, there is illustrated a flow chart of a process for implementation of a public system for accommodating mobile devices in accordance with the present disclosure. At 800, a mobile device is brought within communication range of a PAP, and authentication is initiated. At 802, the user provides the SIS data by inserting an SIS card, where appropriate. If the SIS module is embedded in the mobile device, authentication occurs automatically, or in response to a user selection made on the device. At 804, the PAP responds with a successful authentication signal. At 806, the user requests content and/or services according to authenticated subscription data. At 808, a decision is made to decode the multimedia content using the local system. If YES, flow is to 810 to decode the content locally. At 812, the decoded content is transmitted by the system to the mobile device using the PAP. At 814, the mobile device receives the decoded content and presents it to the user.

Alternatively, if the system does not do the decoding, flow is from 808 to 816 where the PAP transmits the encoded content to the mobile device. At 818, the device decodes the content. At 814, the mobile device receives the decoded content and presents it to the user.

Figure 9:
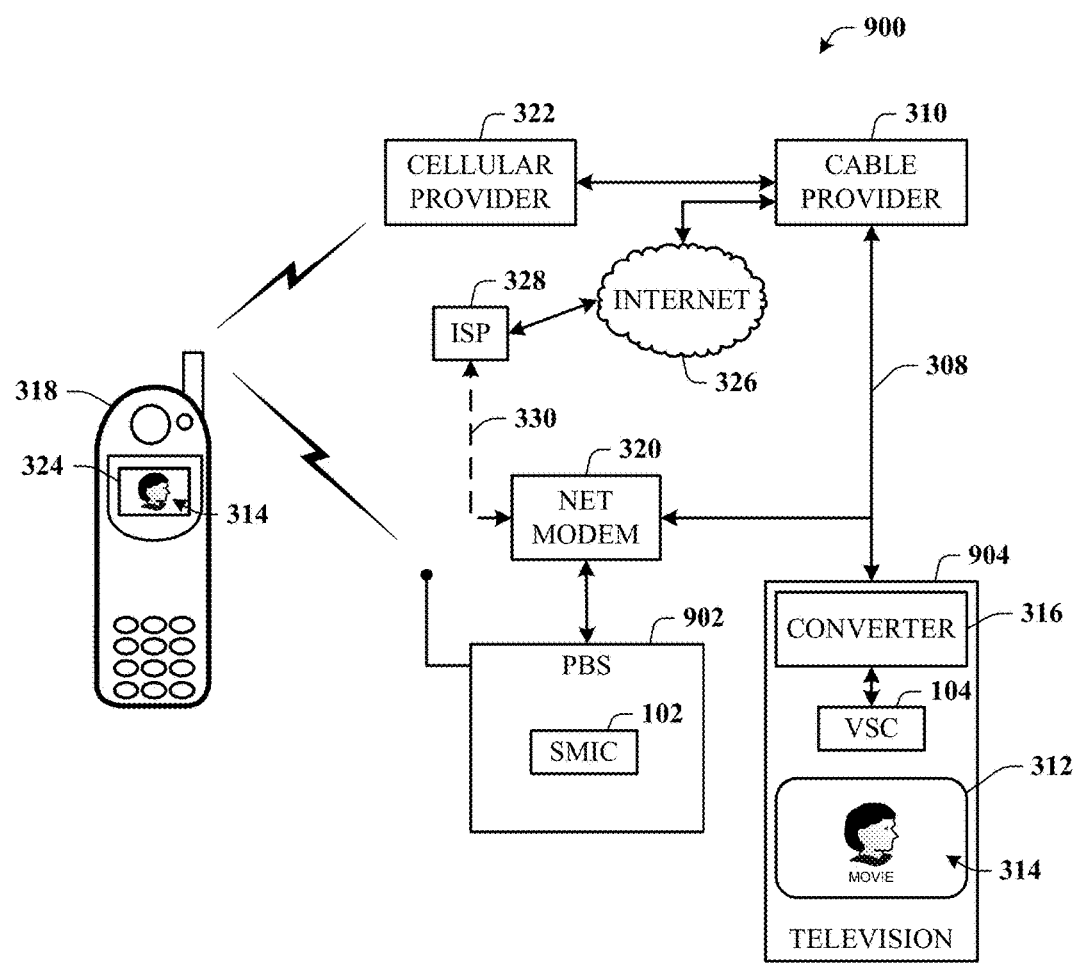
FIG. 9 illustrates a system where the SMIC and VSC of the SIS of FIG. 1 are disposed separately and respectively in a PBS and television.

Referring now to FIG. 9, there is illustrated a system 900 where the SMIC 102 and VSC 104 of the SIS 100 of FIG. 1 are disposed separately and respectively in a PBS 902 and television 904. The PBS 902 includes the SMIC 102 for authenticating the mobile device 318 and facilitating access to subscribed cellular services of the associated user. Once authenticated, the SMIC 102 transmits a key or token to the VSC 104 of the television 904. The VSC 104 then authenticates the user with the cable provider 310 via the cable connection 308. Thus, there is provided the SIS of FIG. 1 in a distributed fashion where the token or key uniquely defines the relationship between the SMIC 102 and the VSC 104 for a given user. The user can present the SMIC 102 in the form of a card, such that the card is inserted into the PBS 902. The unique relationship is then established for that user. The user can then receive multimedia content on the mobile device 318 and/or process incoming and outgoing calls in accordance with the description provided hereinabove, but not included here, for purposes of brevity. This also applies to the public implementation of FIG. 7, such that a user need only provide the SMIC module data for use with a VSC module of the airport or public system.

In an implementation that can be used for legacy equipment, the television 904 does not include the internal converter 316 or VSC module 104. An external converter (not shown) includes the VSC 104. In the same way as before, the SMIC 102 of the PBS 902 establishes the unique relationship therewith, and facilitates the download of decoded content to the PBS 904, which is then forwarded to the mobile device 318 for presentation to the user. Other features of such an implementation are described with respect to FIG. 3 above.

Figure 10:
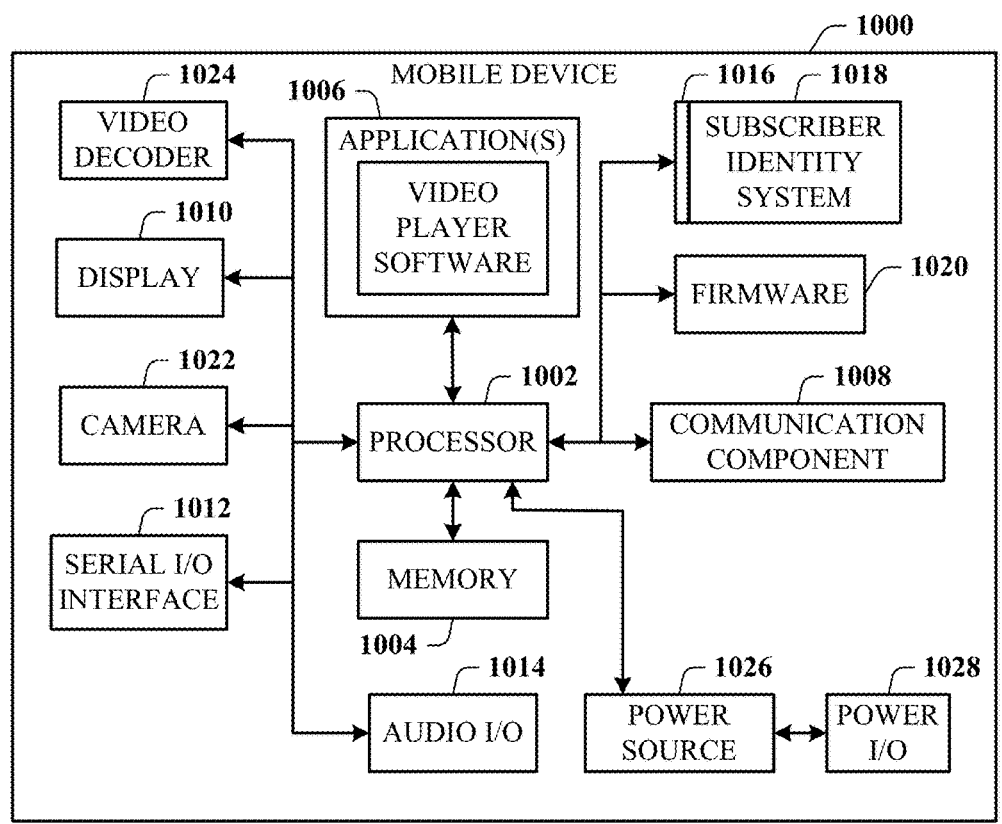
FIG. 10 illustrates a block diagram of a mobile device suitable for presentation of multimedia content in accordance with the present disclosure.

Referring now to FIG. 10, there is illustrated a block diagram of a mobile device 1000 suitable for presentation of multimedia content in accordance with the present disclosure. The device 1000 includes a processor 1002 for controlling all onboard operations and processes. A memory 1004 interfaces to the processor 1002 for temporary storage of data and one or more applications 1006 being executed by the processor 1002. A communication component 1008 interfaces to the processor 1002 to facilitate wired/wireless communication with external systems.

The device 1000 includes a display 1010 for displaying content downloaded in accordance with the present disclosure, and for displaying text information related to operating and using the device features. A serial I/O interface 1012 is provided in communication with the processor 1002 to facilitate serial communication (e.g., USB, and/or IEEE 1394) via a hardwire connection. This supports updating and troubleshooting the device 1000, for example. Audio capabilities are provided with an audio I/O component 1014, which can include a speaker for the output of audio signals related to, for example, recorded data or telephony voice data, and a microphone for inputting voice signals for recording and/or telephone conversations.

The device 1000 includes an interface 1016 for accommodating the SIS in the form factor of a card 1018, and interfacing the SIS card 1018 to the processor 1002. Firmware 1020 is also provided to store and provide to the processor 1002 startup and operational data. The device 1000 can also include an image capture component 1022 such as a camera. The user can then take digital pictures, and transmit the pictures to a remote location or store the pictures locally. In more robust implementations, the device 1000 includes a video decoder 1024 for decoding encoded multimedia content. The device also includes a power source 1026 in the form of batteries, which power source 1026 interfaces to an external power system or charging equipment via a power I/O component 1028.

The applications 1006 resident on the device 1000 include, for example, an operating system for configuring and manipulating local data and settings, a browser for interacting with websites, music players, video player software, and any other software suitable for operation on the device 1000.

Figure 11:
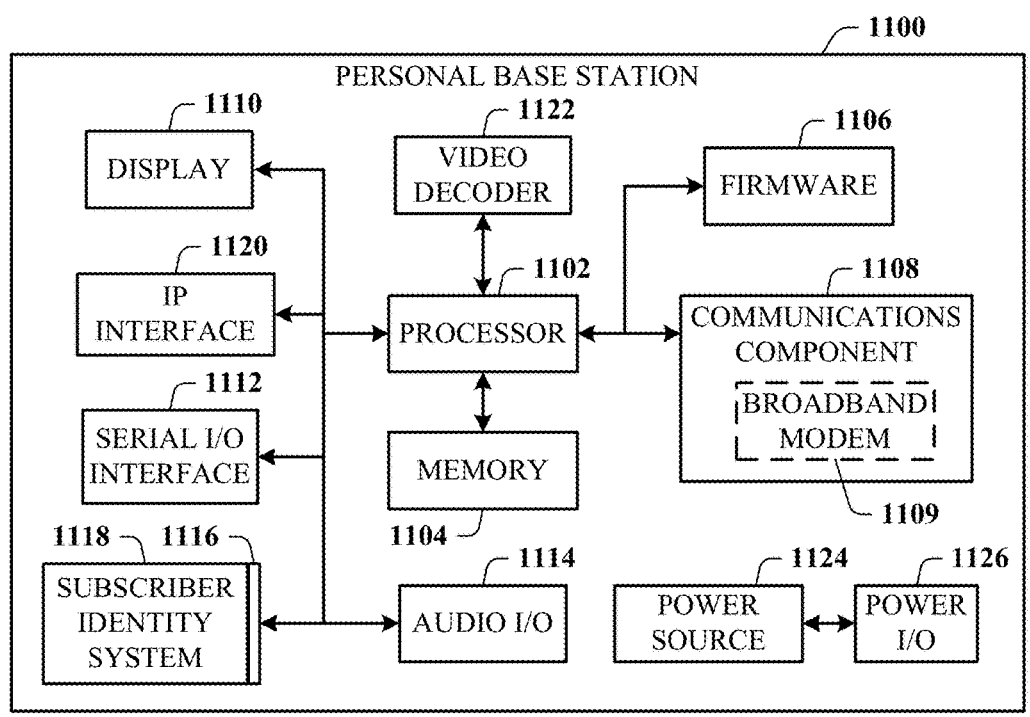
FIG. 11 illustrates a block diagram of a PBS operable in accordance with aspects of the present disclosure.

Referring now to FIG. 11, there is illustrated a block diagram of a PBS 1100 operable in accordance with aspects of the present disclosure. The PBS 1100 includes a processor 1102 for controlling and processing all onboard operations and functions. A memory 1104 interfaces to the processor 1102 for the storage of data and one or more applications stored in firmware 1106 and being executed by the processor 1102. The memory 1104 can include mass storage capability such that the PBS 1100 can stored the multimedia content in addition to transmitting the content therefrom. This further includes storing telephone messages received over the PSTN, as well as VoIP signals communicated over the digital IP network. The firmware 1106 also stores startup code for execution in initializing the PBS 1100. A communication component 1108 interfaces to the processor 1102 to facilitate wired/wireless communication with external systems. In another implementation, the communications component 1108 includes a broadband modem 1109 such that the PBS 1100 includes the capability to interface directly to a broadband network to accommodate IP traffic, forgoing the need to further interface to an external broadband modem, router, or other suitably comparable IP communication device.

The PBS 1100 may include a display 1110 for displaying text and graphics related to telephony functions, for example, a Caller ID function and a setup function. A serial I/O interface 1112 is provided in communication with the processor 1102 to facilitate serial communication (e.g., USB, and/or IEEE 1394) via a hardwire connection. This supports updating and troubleshooting the PBS 1100, for example. Audio capabilities are provided with an audio I/O component 1114, which can include a speaker for the output of audio signals related to, for example, recorded data or telephony voice data, and a microphone for inputting voice signals for recording and/or telephone conversations.

The PBS 1100 includes an interface 1116 for accommodating the SIS in the form factor of a card 1118, and interfacing the SIS card 1118 with the processor 1102.

In more robust implementations, the PBS 1100 includes an IP interface 1120 for accommodating IP traffic from the Internet via an ISP or cable provider. Thus, VoIP traffic can be utilized by the PBS 1100, and IP-based multimedia content can be received in either an encoded or a decoded format. A video decoder 1122 can be provided for decoding encoded multimedia content. The PBS 1100 also includes a power source 1124 in the form of batteries and/or an AC power subsystem, which power source 1124 interfaces to an external power system or charging equipment (not shown) via a power I/O component 1126.

Figure 12:
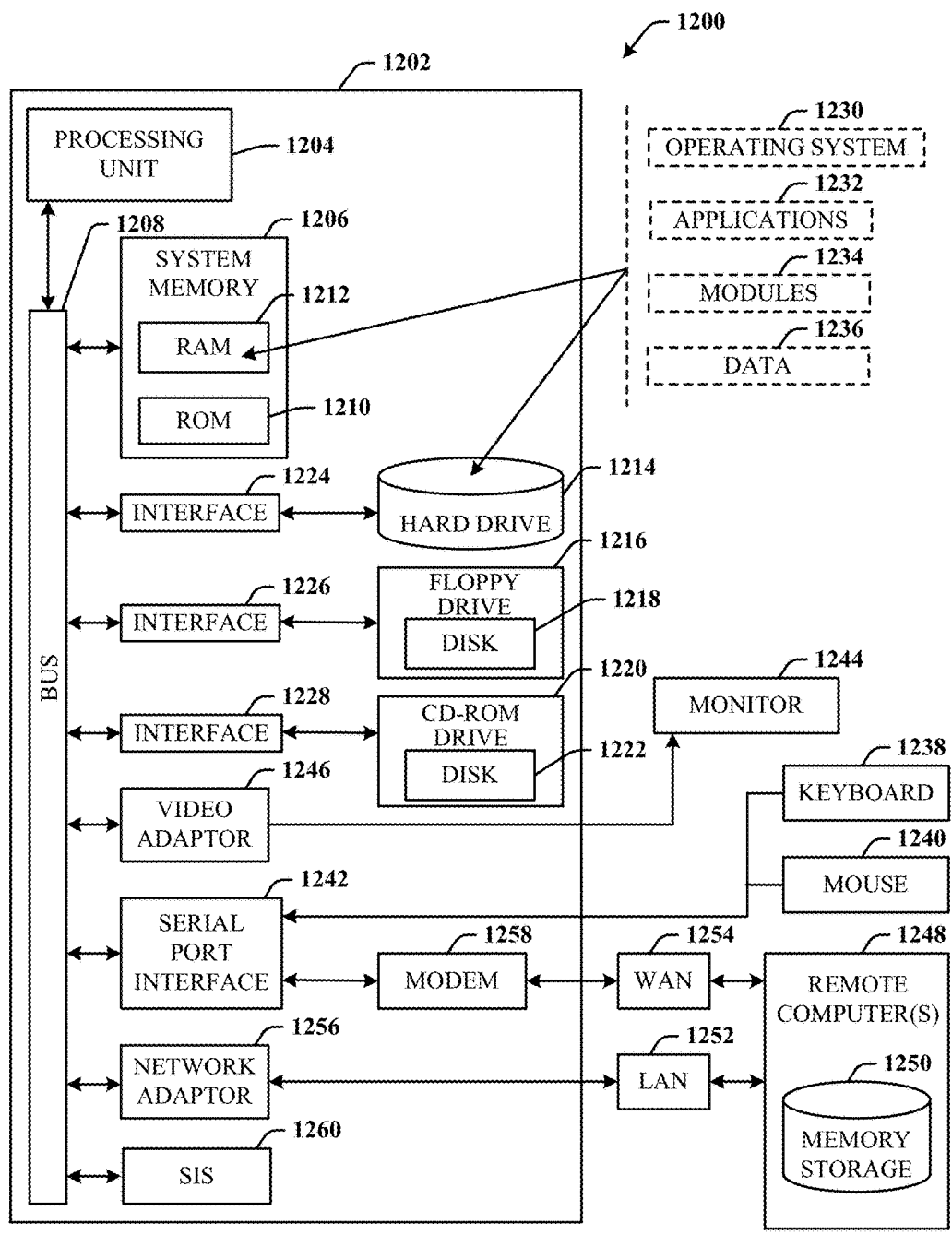
FIG. 12 illustrates a block diagram of a computer operable to execute the disclosed architecture.

Referring now to FIG. 12, there is illustrated a block diagram of a computer 1200 operable to execute the disclosed architecture. Such a computer 1200 with wireless capability can be considered to be operational as a personal base station in accordance with the present disclosure. Thus, wireless phones that support 3G technology, for example, can be used with the computer 1200 having such capabilities. In order to provide additional context for various aspects of the present disclosure, FIG. 12 and the following discussion are intended to provide a brief, general description of a suitable computing environment 1200 in which the various aspects of the present disclosure can be implemented.

While the disclosure has been described above in the general context of computer-executable instructions that may run on one or more computers, those skilled in the art will recognize that the disclosure also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the disclosure may also be practiced in distributed computing environments where certain tasks are performed by remote processing devices that are linked through a communications network. In a distributed computing environment, program modules may be located in both local and remote memory storage devices.

With reference again to FIG. 12, there is illustrated an exemplary environment 1200 for implementing various aspects of the disclosure that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 may be any of various commercially available processors. Dual microprocessors and other multiprocessor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 may further include a hard disk drive 1214, a magnetic disk drive 1216, (e.g., to read from or write to a removable disk 1218) and an optical disk drive 1220, (e.g., reading a CD-ROM disk 1222 or to read from or write to other high capacity optical media such as Digital Video Disk (DVD)). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The drives and their associated computer-readable media provide nonvolatile storage of data, data structures, computer-executable instructions, and so forth. For the computer 1202, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present disclosure.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the present disclosure can be implemented with various commercially available operating systems or combinations of operating systems.

A user can enter commands and information into the computer 1202 through a keyboard 1238 and a pointing device, such as a mouse 1240. Other input devices (not shown) may include a microphone, an IR remote control, a joystick, a game pad, a satellite dish, a scanner, or the like. These and other input devices are often connected to the processing unit 1204 through a serial port interface 1242 that is coupled to the system bus 1208, but may be connected by other interfaces, such as a parallel port, a game port, a universal serial bus ("USB"), an IR interface, etc. A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 may be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include a local area network (LAN) 1252 and a wide area network (WAN) 1254. Such networking environments are commonplace in offices, enterprise-wide computer networks, intranets and the Internet.

When used in a LAN networking environment, the computer 1202 is connected to the local network 1252 through a wired or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 typically includes a modem 1258, or is connected to a communications server on the LAN, or has other means for establishing communications over the WAN 1254, such as the Internet. The modem 1258, which may be internal or external and a wired or wireless device, is connected to the system bus 1208 via the serial port interface 1242. In a networked environment, program modules depicted relative to the computer 1202, or portions thereof, may be stored in the remote memory storage device 1250. Exemplary implementations of the SIS 1260 are a module manufactured into the system board or a slot-based card for slot-in insertion by a user. It will be appreciated that the network connections shown are exemplary and other means of establishing a communications link between the computers may be used.

The computer 1202 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

What has been described above includes examples of the present disclosure. It is, of course, not possible to describe every conceivable combination of components or methodologies for purposes of describing the present disclosure, but one of ordinary skill in the art may recognize that many further combinations and permutations of the present disclosure are possible. Accordingly, the present disclosure is intended to embrace all such alterations, modifications and variations that fall within the spirit and scope of the appended claims. As an example, the word authentication has been used in many of the discussions above but a person of ordinary skill in the art understands that the disclosed innovations are also applicable to the similar activities of registration and activation. Although the multimedia services have been discussed above primarily in the context of video and television, the disclosed innovations may be used for access permissions to any sort of multimedia content such as, for example, satellite radio. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   initiating, by a system comprising a processor, a first communication with a portable communications device via a wireless protocol in response to a first determination that the portable communications device is within a defined range;
   establishing, by the system and via a network modem device during at least a portion of the first communication with the portable communications device, a second communication with a multimedia device that comprises a display and receives multimedia content from a content provider device;
   authenticating, by the system, the portable communications device with regard to the system, comprising reinitiating the authenticating of the portable communications device with regard to the system according to a defined number of attempts in response to an unsuccessful attempt to authenticate the portable communications device with regard to the system;
   in response to a second determination that the portable communications device is successfully authenticated with regard to the system, sending, by the system, an authentication key associated with the portable communications device to the multimedia device;
   authenticating, by the system, the portable communications device with regard to the multimedia content; and
   in response to a third determination that the portable communications device is successfully authenticated with regard to the multimedia content, receiving, by the system and via the network modem device, the multimedia content from the multimedia device that comprises the display, and sending, by the system in response to the receiving the multimedia content from the multimedia device that comprises the display, a modified version of the multimedia content to the portable communications device, the modified version of the multimedia content being in a multimedia format for presentation on the portable communications device that is different than a different multimedia format for presentation on the display of the multimedia device.

2. The method of claim 1, wherein the sending the modified version of the multimedia content to the portable communications device comprises sending the modified version of the multimedia content at a lower bit rate than a bit rate associated with the multimedia content.

3. The method of claim 1, wherein the authenticating the portable communications device with regard to the system comprises authenticating the portable communications device based on subscriber identity information.

4. The method of claim 1, wherein the reinitiating the authenticating comprises, in response to an unsuccessful attempt to authenticate the portable communications device with regard to the system, reinitiating the authenticating of the portable communications device with regard to the system according to a defined number of attempts based on subscriber data stored by the system and representing subscription information associated with the portable communications device.

5. The method of claim 1, further comprising storing, by the system, the multimedia content received from the multimedia device.

6. The method of claim 1, further comprising signaling, by the system, the content provider device to transmit the multimedia content to the multimedia device.

7. The method of claim 1, further comprising controlling, by the system, distribution of the multimedia content to the portable communications device based on a level of service associated with the portable communications device.

8. A device, comprising:
   a processor; and
   a memory that stores executable instructions that, when executed by the processor, facilitate performance of operations, comprising:
   communicating with a first device that comprises a display;
   communicating with a second device, during at least a portion of the communicating with the first device that comprises the display, in response to a first determination that the second device is within a defined range;
   authenticating the second device with the device, comprising reinitiating the authenticating of the second device with the device according to a defined number of attempts in response to an unsuccessful attempt to authenticate the second device with the device;
   in response to a second determination that the second device is successfully authenticated with the device, transmitting a key associated with the second device to the first device;
   authenticating the second device with multimedia content;
   receiving, via a third device, the multimedia content from the first device that comprises the display; and
   transmitting, to the second device in response to the receiving the multimedia content from the first device that comprises the display, a modified version of the multimedia content that comprises a resolution that is different than a different resolution of the multimedia content associated with the first device.

9. The device of claim 8, wherein the transmitting the modified version of the multimedia content to the second device comprises transmitting a recoded version of the multimedia content at a lower bit rate than a bit rate associated with the multimedia content.

10. The device of claim 8, wherein the operations further comprise defining a level of telephony service associated with the second device.

11. The device of claim 8, wherein the transmitting the key comprises transmitting the key to the first device to facilitate downloading of the multimedia content to the second device.

12. The device of claim 8, wherein the operations further comprise interfacing with the third device to facilitate communication of the multimedia content to the second device.

13. The device of claim 8, wherein the transmitting the modified version of the multimedia content comprises transmitting a modified version of video information to the second device.

14. The device of claim 8, wherein the transmitting the modified version of the multimedia content comprises transmitting, to the second device, the modified version of the multimedia content based on display capabilities of the second device.

15. The device of claim 8, wherein the operations further comprise managing distribution of the multimedia content based on digital rights information associated with the multimedia content.

16. A machine-readable storage medium comprising executable instructions that, when executed by the processor, facilitate performance of operations, comprising:

communicating with a multimedia device that comprises a display and receives multimedia content from a content provider device;

communicating with a mobile device, during at least a portion of the communicating with the multimedia device that comprises the display, in response to a first determination that the mobile device is within a defined range;

authenticating the mobile device with regard to the device, comprising reinitiating the authenticating of the mobile device with regard to the device according to a defined number of attempts in response to an unsuccessful attempt to authenticate the mobile device with regard to the device;

in response to a second determination that the mobile device has been successfully authenticated with regard to the device, sending an authentication token associated with the mobile device to the multimedia device;

authenticating the mobile device with regard to multimedia content;

receiving, via a network device, the multimedia content from the multimedia device that comprises the display; and sending, to the mobile device in response to the receiving the multimedia content from the multimedia device that comprises the display, a recoded version of the multimedia content that comprises a first display format that is different than a second display format associated with the multimedia content.

17. The machine-readable storage medium of claim 16, wherein the sending the recoded version of the multimedia content to the mobile device comprises sending the recoded version of the multimedia content at a different bit rate than a bit rate associated with the multimedia content.

18. The machine-readable storage medium of claim 16, wherein the authenticating the mobile device with regard to the device comprises authenticating the mobile device based on subscription information.

19. The machine-readable storage medium of claim 16, wherein the authenticating the mobile device with regard to the multimedia content comprises authenticating the mobile device based on multimedia subscription information.

20. The machine-readable storage medium of claim 16, wherein the operations further comprise informing the content provider device to transmit the multimedia content to the multimedia device that comprises the display.

* * * * *